W. CORFIELD.
Making Illuminating Fluid.

No. 54,061.

Patented Apr. 17, 1866.

Witnesses:
Wm Albert Steel
John Parker

Inventor:
Wm Corfield
By his Atty
C. Howson

UNITED STATES PATENT OFFICE.

WILLIAM CORFIELD, OF PHILADELPHIA, PENNSYLVANIA, ASSIGNOR TO HIMSELF AND J. A. DOUGHERTY & SONS.

IMPROVEMENT IN THE MANUFACTURE OF BURNING-FLUID.

Specification forming part of Letters Patent No. 54,061, dated April 17, 1866.

*To all whom it may concern:*

Be it known that I, WILLIAM CORFIELD, of Philadelphia, Pennsylvania, have invented an Improvement in the Manufacture of Fluid for Illuminating and other Purposes; and I do hereby declare the following to be a full, clear, and exact description of the same, reference being had to the accompanying drawings, and to the letters of reference marked thereon.

My invention consists of a cheap and simple mode of manufacturing fluid for illuminating and other useful purposes by mixing ordinary spirits of turpentine with the fermented preparation of grain, &c., used for distilling spirits, the vapor from this mixture passing from the still and through the condenser, which converts it into a milky fluid, the latter being subsequently redistilled and converted into an available fluid for illuminating and other useful purposes.

Figure 1:
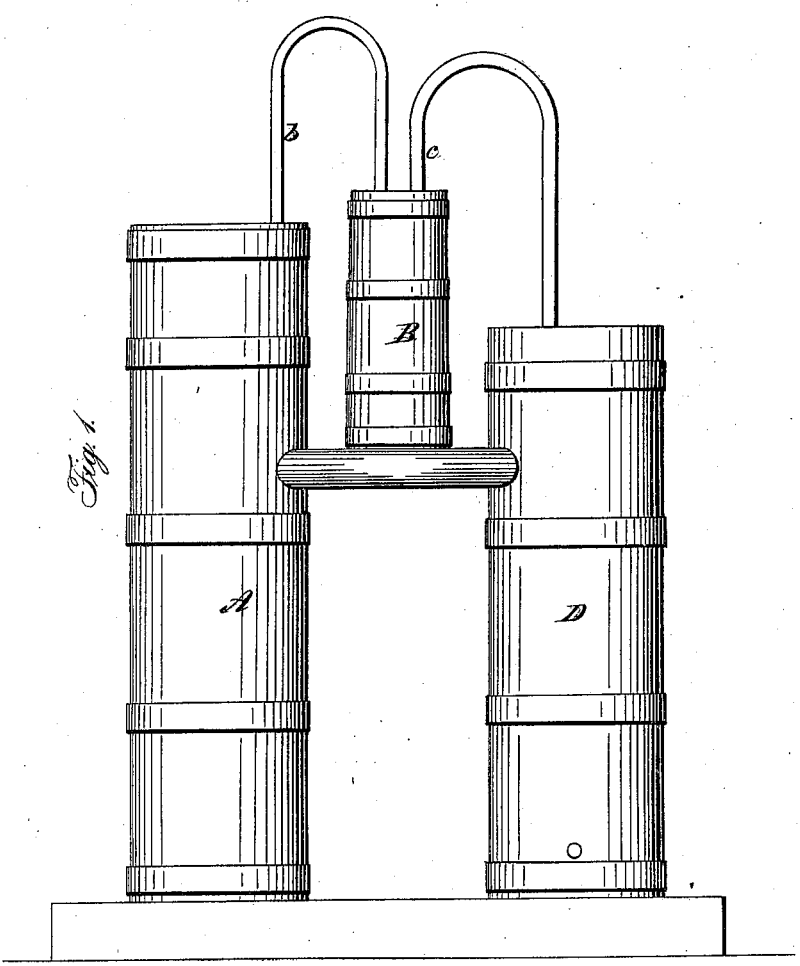
Figure 2:
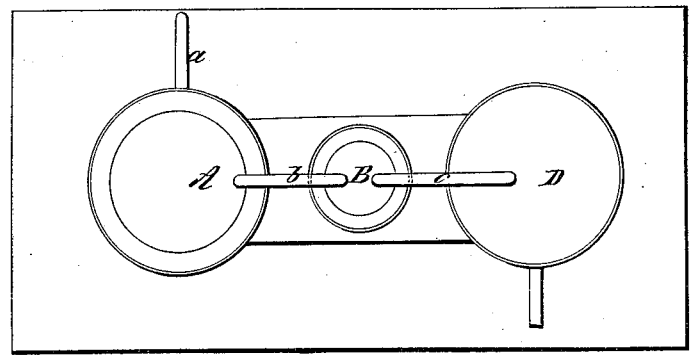

On reference to the accompanying drawings, which form a part of this specification, Figure 1 represents an elevation of apparatus for carrying out my invention, and Fig. 2 a plan view.

A is a still, such as is commonly used for distilling spirits from fermented preparations of grain, &c., by the direct action of steam. The interior arrangement of stills of this class is too well known to those familiar with the process of distillation to require a minute description. It will suffice to observe that A is the still, B the ordinary doubler, and D the condenser, *a* being the pipe for conveying the steam to the still, *b* the pipe for the passage of the vapor to the doubler, and *c* the pipe for conveying the vapor from the doubler to the condenser, through which the pipe is continued in the form of a coil.

The fermented preparation of grain, &c., and turpentine used in the process should be in about the proportion of five hundred gallons of the former to five gallons of the latter, the mixture being placed in the still, and the vapors being converted by the condenser into a milky fluid, which, by subsequent distillation in any still capable of producing ninety-five per cent. alcohol, is converted into an available fluid for illuminating and other useful purposes.

It will be evident that the process is much more simple than that heretofore practiced of manufacturing burning-fluid from alcohol and turpentine.

I do not desire to confine myself to the apparatus herein described for carrying out my invention, as other distilling apparatus may be employed with good effect; but

I claim as my invention and desire to secure by Letters Patent—

Mixing spirits of turpentine with fermented preparations of grain or other materials used in the manufacture of alcohol, and distilling the mixture, substantially in the manner and for the purpose herein set forth.

In testimony whereof I have signed my name to this specification in the presence of two subscribing witnesses.

WM. CORFIELD.

Witnesses:
H. HOWSON,
W. J. R. DELANY.